United States Patent [19]

Lindquist

[11] 4,150,572
[45] Apr. 24, 1979

[54] REVERSIBLE THERMOMETER

[75] Inventor: Julius A. Lindquist, Bridgewater, N.J.

[73] Assignee: Johnson & Johnson, New Brunswick, N.J.

[21] Appl. No.: 857,638

[22] Filed: Dec. 5, 1977

[51] Int. Cl.$^2$ ............................................. G01K 11/16
[52] U.S. Cl. ..................................... 73/356; 116/207; 252/408; 116/217
[58] Field of Search ............. 73/356, 358; 116/114 V; 252/408

[56] References Cited

U.S. PATENT DOCUMENTS

| | | | |
|---|---|---|---|
| 3,175,401 | 3/1965 | Geldmacher | 73/358 |
| 3,440,882 | 4/1969 | Jones | 73/356 |
| 3,465,590 | 9/1969 | Kluth et al. | 73/358 X |
| 3,665,770 | 5/1972 | Sagi et al. | 73/358 X |
| 3,920,574 | 11/1975 | Brown, Jr. et al. | 73/356 X |
| 3,956,153 | 5/1976 | Chadha | 73/356 X |
| 3,974,317 | 8/1976 | Sharpless | 73/356 X |
| 3,975,288 | 8/1976 | Davis | 73/356 X |
| 3,980,581 | 9/1976 | Godsey, Jr. et al. | 73/356 X |
| 4,028,944 | 6/1977 | Erb | 73/356 |

Primary Examiner—Richard C. Queisser
Assistant Examiner—Joseph W. Roskos

[57] ABSTRACT

A thermometer including a heat sensitive material which undergoes a reversible visible change from a crystalline solid to a viscous mass at a predetermined temperature, said heat sensitive material comprising an individual or mixture of low molecular weight organic compounds and a polymer, said polymer being present in said mixture in an amount, effective to retard the crystallization of said organic compound between temperatures of from about room temperature to said predetermined temperature. Preferably a plurality of discreet heat sensitive materials each of which undergoes a visible change at a different predetermined temperature are supported on either a flat sheet or round cylinder which may be a dark transparent filter material. The heat sensitive materials are covered by a light transparent filter material which is preferably yellow. In the most preferred embodiment of the instant invention, said heat sensitive materials are contained in the compartments above perforations of a perforated sheet. Both the heat sensitive material and said perforated sheet may be the same color.

27 Claims, 2 Drawing Figures

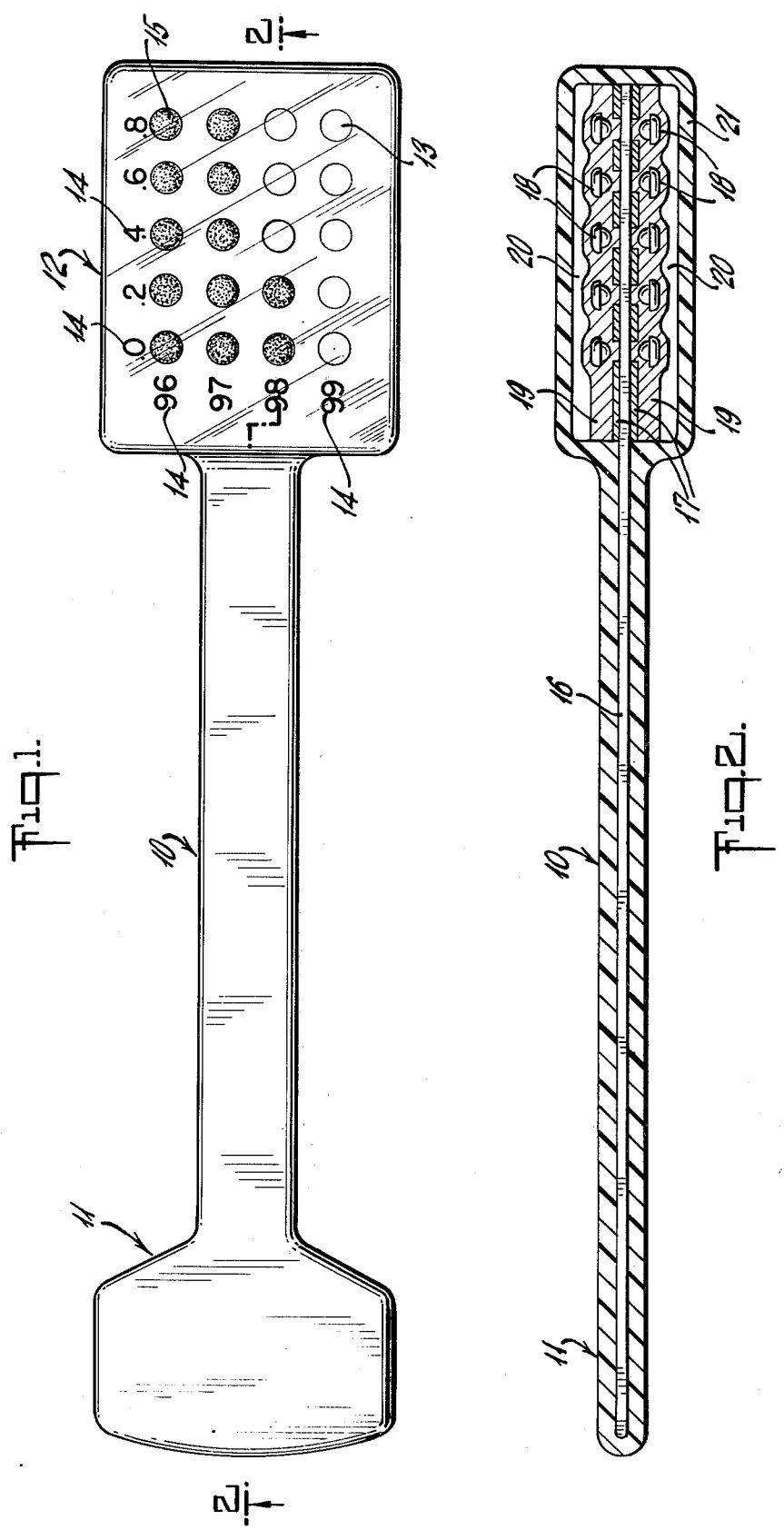

REVERSIBLE THERMOMETER

FIELD OF THE INVENTION

A thermometer including a heat sensitive material which undergoes a reversible visible change from a crystalline solid to a viscous mass at a predetermined temperature, said heat sensitive material comprising an individual or mixture of low molecular weight organic compounds and a polymer, said polymer being present in said mixture in an amount, effective to retard the crystallization of said organic compound between temperatures of from about room temperature to said predetermined temperature. Preferably a plurality of discreet heat sensitive materials each of which undergoes a visible change at a different predetermined temperature are supported on either a flat sheet or round cylinder which may be a dark transparent filter material. The heat sensitive materials are covered by a light transparent filter material which is preferably yellow. In the most preferred embodiment of the instant invention, said heat sensitive materials are contained in the compartments above perforations of a perforated sheet. Both the heat sensitive material and said perforated sheet may be the same color.

BACKGROUND OF THE PRIOR ART

Thermometers which measure temperature by means of heat sensitive materials which undergo a change of state at a defined temperature are well known in the art. These thermometers may be either disposable, that is, the change of state may be irreversible, (as for example, in the prior art thermometers wherein the heat sensitive materials melt and contact a dye which is soluble therein) or non-disposable, that is reversible. Examples of thermometers which utilize heat sensitive materials that undergo a change in state from an opaque solid to a transparent liquid at a predetermined temperature may be found in U.S. Pat. No. 3,946,612, 3,175,401, 3,465,590 and 3,665,770.

In U.S. Pat. No. 3,046,612 the heat sensitive materials may be a solid solution, e.g. a mixture of o-chloro and o-bromonitrobenzene or various other mixtures of organic compounds. In this reference, it is noted that by incorporation of a third component to depress the melting point, higher melting solid solutions can be used for applications wherein it is desirable to measure lower temperatures. It is nowhere taught, shown nor suggested in this reference that said third component could be a polymer.

In U.S. Pat. No. 3,175,401 a reversible thermometer is disclosed which utilizes mixtures of dichlorobenzene and diphenyl or various other organic compounds as the heat sensitive material. To obtain reversibility as well as ease of reading, brightly colored glass chips are suspended in the heat sensitive material which, upon the melting thereof, sink to the transparent bottom of the compartment holding said heat sensitive material. To reuse this thermometer, the heat sensitive material must be remelted and the thermometer inverted. It is noted that this is a time consuming step, but illustrates one solution to the problem of providing a reversible, easily readable thermometer.

U.S. Pat. No. 3,465,590 uses fatty acids, including the binary and ternary mixtures thereof as the heat sensitive material. There is no teaching of using fatty acids in admixtures with polymers.

U.S. Pat. No. 3,665,770 describes the known problems with change of state thermometers. One problem of particular interest is that the change of state is not maintained for very long unless made irreversible. More particularly, the patentee points out that when the thermometer is removed from a patient's mouth it may quickly cool down and thus change the reading. The use of various dyes soluble in the melted heat sensitive material, which wick into an absorbent sheet has been notes as one method for solving this problem. Of course, these thermometers can only be used once.

In U.S. Pat. No. 3,704,895 the concept of providing an additional component along with the heat sensitive mixture for the purpose of magnifying the change in state is taught. In one embodiment a higher melting point component which forms an eutectic mixture having a lower melting point than the heat sensitive compound is used. It is noted that said higher melting point component as disclosed does not include a polymer.

U.S. Pat. No. 3,859,856 teaches the use of specific super coolable materials which maintain the melted state for an extended time after the thermometer is removed from the environment, the temperature of which is being measured. The materials taught in this patent are inherently super coolable such as, for example, the eutectic mixture of sodium thiosulfate pentahydrate and sodium acetate trihydrate. In order to reuse the thermometers of this patent, they must be 'super cooled' for example, by refrigeration in order to convert the melted materials back to a crystalline state. This refrigeration step is unnecessary with the thermometers of the instant invention. As will be further disclosed below, the instant invention relates to a method of retarding the initiation of crystallization thereby making all heat sensitive materials which undergo reversible visible change by means of crystallization maintain the melted state for a time sufficient to read the temperature. However, unlike the prior art thermometers which utilize 'super coolable' materials, a super cooling step, e.g. refrigeration, is not necessary prior to reuse. Thus the flexibility of the instant invention over the teaching of this patent will be apparent.

U.S. Pat. No. 3,956,153 teaches the use of nucleating agents to promote the recrystallization of a heat sensitive material that has undergone phase transition. The instant invention in contradistinction relates to maintaining the state, after phase transition, for a time sufficient to enable the user of the thermometer to read the temperature, however, the use of nucleating agents is not precluded from the scope of the instant invention, since many of the known heat sensitive materials which are useful in this invention tend to super cool. The presence of a nucleating agent prevents this from occurring, while the presence of the polymer extends the time prior to crystallization of the compositions described in U.S. Pat. No. 3,956,153 from a range of 15–30 seconds to a range of from 45 seconds to about 3 minutes or more. In this range it is easier for the user to read the temperature without concern with the time involved in taking the reading.

SUMMARY OF THE INVENTION

The instant invention relates to a thermometer including a heat sensitive material which undergoes a reversible visible change from a crystalline solid to a viscous mass at a predetermined temperature, said heat sensitive material comprising an individual or mixture of low molecular weight organic compounds and a polymer, said polymer being present in said mixture in an amount effective to retard the crystallization of said organic compounds between temperatures of from about room temperature to said predetermined temperature. For the purposes of this invention the low molecular weight organic compounds will have an average molecular weight of less than about 1,000.

The thermometer of the instant invention preferably comprises a plurality of discreet heat sensitive materials each of which undergo a visible, reversible change from an opaque crystalline solid to a transparent viscous mass at a different predetermined temperature. This novel thermometer may comprise a dark opaque or transparent filter sheet on which is supported a perforated opaque sheet wherein said perforations define individual overlying compartments. Each of these compartments will contain a heat sensitive material which undergoes a reversible change of state at a different predetermined temperature. A light transparent filter sheet covering said heat sensitive materials may also be included.

The heat sensitive material will comprise an organic compound or a mixture of organic compounds which melts at a predetermined temperature. When the thermometer is to be used in medical applications, that is, for measuring the temperature of humans, a plurality of heat sensitive materials which undergo phase change at various temperatures ranging from about 95° to 105° F. are used. The number of individual heat sensitive materials that will be used will be dependent on the accuracy of measurement desired. For example, heat sensitive materials which undergo phase change at temperatures differing by 0.2° F. increments will be suitable, thus the preferred thermometer for use in measuring the temperature of humans will include 51 different heat sensitive materials. Organic compounds which undergo changes of state in the 95° to 105° F. temperature range are well known in the art and are specifically taught in the above patents which are herein incorporated by reference for the purpose of disclosing organic compounds useful in formulating heat sensitive materials for the thermometers of the instant invention. The most preferred mixtures of organic compounds for use in the thermometers of this invention are solid solutions of o-chloro nitrobenzene and o-bromonitrobenzene; or m-bromonitrobenzene and m-iodonitrobenzene. These two mixtures in combination with a polymer, as further described below, allows one to cover the entire clinical temperature of from 95° to 105° C.

The purpose for including the polymer in the heat sensitive materials is to retard the initiation of crystallization as well as crystalline growth, so that the user can have sufficient time to read the temperature without the fear of inaccuracy due to crystallization occurring after the thermometer is removed from the patient whose temperature is being measured. Polymers dissolved in the aforenoted organic compounds serve as impediments to crystallization in the following manner. Viscosity is increased thus nucleus formation and crystal growth are retarded. Polymers also serve as impurities, thus inhibit nucleus formation as well as retard the rate of crystalline growth. Because the polymer functions as an impurity the melting point of the organic compound is depressed. The extent of melting point depression is governed by the ratio of polymer and the organic compound.

The use of a polymer to depress the melting point of the organic compound advantageously allows use of one individual organic compound to obtain a number of 0.2° F. incremental temperatures by merely adjusting the compositional ratios of polymer.

Additionally, it has been discovered that compounds, particularly organic compounds, which have analogous chemical structures (e.g. analogs, homologs, and optical isomers), have substantially the same molelcular volume or have similar crystalline structure (e.g. isomorphous) and which form solid solutions also allow incremental melting point depression by addition of soluble polymer.

Furthermore, organic compounds used either singularly or combined, i.e., as solid solutions, melting above the upper desired clinical temperature of 105° F. can be advantageously lowered to within the clinical range by addition of soluble polymer. The melting point depression obtained via soluble polymers can be varied by the ratio of polymer and organic compound and also through use of different molecular weights of any given soluble polymer species. In general, for equal weights of polymer dissolved in organic compound, the higher the molecular weight of the polymer the lesser the melting point depression.

Thus, any normally solid organic compound which will when combined with a polymer have a sharp melting point falling within the clinical temperature range may be used in preparing clinical thermometers within the scope of the instant invention. Likewise, incremental amounts of added polymer can modify the melting point such that a range of 0.2° F. temperature increments are obtained. Thus, with the disclosure of the instant invention before him, the skilled artisan, by simple experimentation can formulate a polymer organic compound mixture which undergoes a reversible, visible change from a crystalline solid to a viscous mass, at any predetermined temperature.

The polymer also provides a means for handling organic compounds which are difficult to handle in solid form due to their frangible nature.

Finally, in one preferred embodiment of the instant invention, sufficient polymer is admixed with the organic compound to prevent liquid formation at the predetermined temperature at which the visible, reversible change of state occurs. This preferred embodiment overcomes certain problems of the prior art thermometers wherein the phase change that the heat sensitive material underwent at the predetermined temperature, was the melting of a solid to a liquid. More particularly, in many of the prior art thermometers, a dot or other indicia, underlying the heat sensitive material, was used to enhance the visible change. If a liquid was formed at said predetermined temperature the following difficulties could occur.

First, if the thermometer was tilted, the melt woud gravitationally flow to partially expose the underlying dot.

Second, surface tension effecting a meniscus would thin the center portion of the heat sensitive material whereby the underlying dot might also be visible.

Finally, unless the crystals formed were very minute to provide hiding power, the underlying dot would be visible.

It should be noted that by proper choice of polymer, the crystal habit of the organic compound can be varied to provide minute crystals of greater hiding power, thus providing another advantage for the thermometer of the instant invention.

The amount of polymer included in said heat sensitive material is sufficient to retard crystallization and velocity of crystal growth of said organic compound over the temperature range of from room temperature to the temperature at which said heat sensitive material undergoes phase transition. The polymer must be soluble in said organic compound or compounds, at said predetermined temperature, in order to obtain the benefits of this invention. A polymer which is soluble at a level of from about 10 to 75 weight %, preferably 10 to 50 weight % based on organic compound will be suitable for the thermometers of the instant invention.

In general, the polymer will have a number average molecular weight of from 2,000 to 2,000,000, e.g. 5,000 to 500,000 and may be either a naturally occurring polymer or a synthetic polymer. Thermoplastic polymers are generally used in the thermometers of the instant invention. The polymers may be branched or essentially straight chain. Suitable examples, include polystyrene, polyacrylates, polyvinyl butyral and cellulose esters, etc. For use with the preferred organic compound mixtures noted above, the polymer may be conveniently selected from the group consisting of polyvinyl butyral or polystyrene.

In some instances, it is desirable to include a nucleating agent in the heat sensitive material since many organic compounds, useful as heat sensitive materials have a tendency to super cool. In the instant invention the combination of nucleating agent and polymer results in a heat sensitive material having increased time for accurate reading of temperature, without the necessity of refrigeration prior to reuse.

The nucleating agents disclosed in U.S. Pat. No. 3,956,153 are suitable for use in the thermometers of the instant invention, especially with the preferred solid solution of o-chloro and o-bromo nitrobenzene. The disclosure of that patent is herein incorporated by reference for the purpose of disclosing useful nucleating agents for the heat sensitive materials disclosed herein.

DESCRIPTION OF THE DRAWINGS

FIG. 1 shows a top view of one embodiment of the thermometer of this invention.

FIG. 2 shows a cut away view taken along line II of FIG. 1.

In a preferred embodiment of the invention the instant novel thermometer 10 comprises a handle portion 11 and an indicator portion 12, which may be adapted for insertion into a human mouth. The indicator portion 12, contains a plurality of compartments 13 each of which contains a heat sensitive material (including polymer) which undergoes a visible, reversible change at a different predetermined temperature. Indicia 14 are associated with each cavity to provide direct reading of the temperature measured. The indicia for the compartments on the lower surface (not shown) correspond to the temperature range of from 100.0 to 103.8. It is noted that the compartments which are dark 15 correspond to those containing a heat sensitive material which has undergone a visible change of state.

As shown in FIG. 2, the preferred embodiment of the instant novel thermometer includes a dark backing sheet 16, laminated to an opaque perforated sheet 17 which may be cardboard or paper. Preferably the perforated sheet is similar to color to the crystallized heat sensitive materials. Superposed above the perforations of the perforated sheet are individual compartments containing heat sensitive materials 18. The individual compartments 18 consist of heat sensitive materials individually encapsulated in a transparent barrier film 19. The barrier film functions to prevent sublimation of the organic compounds used for heat sensitive materials. Polyvinyl alcohol, polyimide, chloro trifluoro ethylene and polyacrylonitrile serve as useful barrier films for the preferred halo nitrobenzenes of this invention. Barrier films for other organic compounds useful as heat sensitive materials will be known to those skilled in the art. It is only desirable, for ease of fabrication of the instant thermometers, that the barrier film be a thermoplastic material sealable with heat or ultra sonic sealing methods. It is noted that the individual compartments containing the heat sensitive materials are somewhat larger than the perforations. It has been found that when the heat sensitive materials are similar in dimension to the perforations and placed therein a shadow effect may be obtained thereby making the thermometer more difficult to read. In the instant preferred embodiment the increased dimensions of the heat sensitive material compartments facilitates reading of the thermometer while the perforations still function to locate and retain the compartments.

Above the compartmental heat sensitive materials is a transparent sheet 20. In a most preferred embodiment, 20 is a yellow filter which acts to minimize color variations between the crystallized heat sensitive materials and thereby promote ease of reading. This feature is especially desirable when the instant thermometer is to be used over the clinical temperature range, since more than one organic compound or mixture of organic compounds must be used to cover this range. It will be appreciated that the use of more than one compound will increase the difficulty of matching the color of each heat sensitive material.

Finally the entire thermometer is encapsulated in a thermoplastic material 21.

The following example is a specific embodiment of the instant invention. There is not intent to limit the scope of the invention thereto since many modifications will be obvious to the skilled artisan in view of the teachings of this specification.

Below are listed the time for initiation of crystallization and velocity of crystalline growth of the samples of heat sensitive materials tested.

TABLE

| Sample | Time to Crystallize | Linear Velocity Crystalline Growth |
| --- | --- | --- |
| Solid Solution | 30 seconds | 12 mm/minute |
| Solid Solution + 30% Butvar$^{TM}$ | 4 minutes | 1.02 mm/minute |
| p-dichlorobenzene | 10 seconds | Too fast to measure |
| p-dichlorobenzene + 30% Butvar$^{TM}$ | 25 seconds | 857 mm/minute |
| p-dichlorobenzene + 30% Butvar$^{TM}$ 5% | 30 seconds | 0.56 mm/minute |
| p-dichlorobenzene + 50% Butvar$^{TM}$ | 30 minutes | 0.08 mm/minute |

Solid solution was a combination of o-chloro and o-bromo nitro benzenes, in a ratio of 18.3.-81.7 weight percent respectively. Butvar TM is a polyvinyl butyral available from Monsanto Polymers and Petrochemical Co. Bentone available from N.L. Industries, Inc.

The above solid solution essentially crystallizes in straight needle shapes. In the presence of Butvar TM the shape resembles feathers and form rosettes. The p-dichlorobenzene also changes shape and tends to form rosettes.

When specific melting point depressions are sought at lower ratios of polymer to heat sensitive materials, initiation of crystallization and growth may require additional retardation. It has been discovered that addition of colloidal materials such as modified Montmorillonite (Bentone) will further retard nucleus formation and crystalline growth to the desired timing.

What is claimed:

1. A thermometer including a heat sensitive material which undergoes a reversible change of state from a crystalline solid to a viscous liquid at a predetermined temperature, said heat sensitive material comprising a mixture including at least one low molecular weight organic compound and a polymer, said polymer being present in said mixture in an amount, effective to retard the rate of recrystallization of said heat sensitive material between temperatures of from about room temperature to said predetermined temperature.

2. The thermometer of claim 1 including a plurality of heat sensitive materials each of which undergoes a reversible change of state from an opaque crystalline solid to a transparent liquid at a different predetermined temperature.

3. The thermometer of claim 2 wherein said mixture comprises a binary mixture of low molecular weight organic compounds.

4. The thermometer of claim 3 wherein said binary mixture comprises o-chloronitrobenzene and o-bromonitrobenzene.

5. The thermometer of claim 4 wherein said polymer is polystyrene.

6. The thermometer of claim 4 wherein said polymer is polyvinyl butyral.

7. The thermometer of claim 4 wherein said heat sensitive material includes a nucleating agent.

8. The thermometer of claim 7 wherein said nucleating agent is anthraquinone.

9. A thermometer including a backing sheet, a plurality of discreet, heat sensitive materials supported thereon, each of which undergoes a reversible change of state from an opaque crystalline solid to a transparent viscous liquid at a different predetermined temperature, each of said heat sensitive materials comprising a mixture including at least one low molecular weight organic compound and a polymer, said polymer being present in said mixture in an amount effective to retard the rate of crystallization of said heat sensitive material at temperatures of from about room temperature to the corresponding different predetermined temperature, and a transparent filter covering said heat sensitive materials.

10. The thermometer of claim 9 wherein said mixture comprises a binary mixture of low molecular weight organic compounds.

11. The thermometer of claim 10 wherein said binary mixture comprises o-chloronitrobenzene and o-bromonitrobenzene.

12. The thermometer of claim 11 wherein said polymer is polystyrene.

13. The thermometer of claim 11 wherein said polymer is polyvinyl butyral.

14. The thermometer of claim 11 wherein said heat sensitive material includes a nucleating agent.

15. The thermometer of claim 14 wherein said polymer is polyvinyl butyral.

16. The thermometer of claim 9 wherein said binary mixture comprises m-iodo nitrobenzene and m-bromonitrobenzene.

17. The thermometer of claim 9 wherein at least one of said heat sensitive materials includes a binary mixture of o-chloronitrobenzene and o-bromo nitrobenzene and at least one other heat sensitive material including a binary mixture of m-iodonitrobenzene and m-nitro bromobenzene.

18. The thermometer of claim 17 wherein said polymer is polyvinyl butyral.

19. A thermometer including a dark transparent sheet, a perforated opaque sheet supported thereon, said perforations defining compartments, each of which contains a heat sensitive material, which undergoes a reversible change of state from an opaque crystalline solid to a transparent viscous liquid at a different predetermined temperature, each of said heat sensitive materials comprising a mixture including at least one organic compound having a molecular weight of less than 1,000 and a polymer, said polymer being present in said mixture in an amount sufficient to retard the rate of recrystallization of said heat sensitive material at temperatures of from about room temperature to the corresponding different predetermined temperature, and a light transparent filter sheet covering said heat sensitive materials.

20. The thermometer of claim 19 wherein said perforated opaque sheet and said heat sensitive material are the same color.

21. The thermometer of claim 20 wherein said light transparent filter is yellow.

22. The thermometer of claim 19 wherein said mixture comprises a binary mixture of low molecular weight organic compounds.

23. The thermometer of claim 22 wherein said binary mixture comprises o-chloronitrobenzene and o-bromonitrobenzene.

24. The thermometer of claim 22 wherein said binary mixture comprises m-iodo nitrobenzene and m-bromonitrobenzene.

25. The thermometer of claim 22 wherein at least one of said heat sensitive materials includes a binary mixture of o-chloronitrobenzene and o-bromo nitrobenzene and at least one other heat sensitive material includes a binary mixture of m-iodonitrobenzene and m-nitro bromobenzene.

26. The thermometer of claim 25 wherein said polymer is polyvinyl butyral.

27. The Thermometer of claim 19 wherein said heat sensitive materials are individually contained in compartments formed in a barrier sheet, said compartments being of greater dimension than said perforations and aligned therewith.

* * * * *